J. H. BAUSER.
Drill-Joints.
No. 154,444.  Patented Aug. 25, 1874.
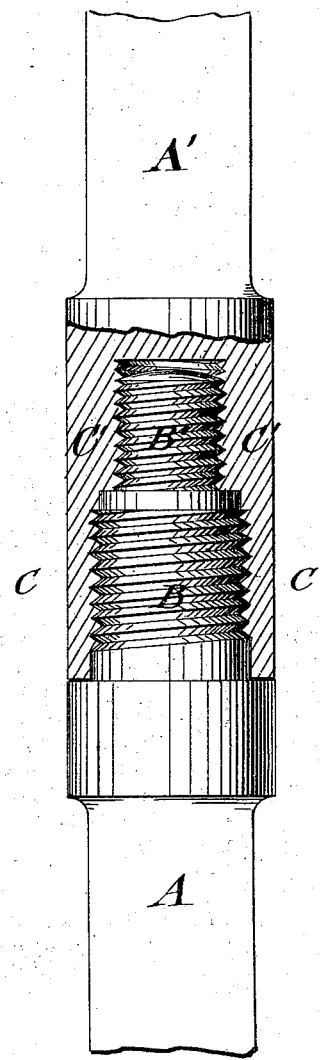

UNITED STATES PATENT OFFICE.

JOHN H. BAUSER, OF PARKER'S CITY, PENNSYLVANIA.

IMPROVEMENT IN DRILL-JOINTS.

Specification forming part of Letters Patent No. 154,444, dated August 25, 1874; application filed October 4, 1873.

*To all whom it may concern:*

Be it known that I, JOHN H. BAUSER, of Parker's City, in the county of Armstrong and State of Pennsylvania, have invented a new and Improved Drill-Joint, of which the following is a specification:

The accompanying drawing represents a sectional side elevation of my improved drill-joint.

The object of my invention is to form a shaft coupling or joint for boring out oil-wells, &c., by which the connection of the drill-joint is greatly strengthened without increasing the size of the coupling or joint, and also the breaking of the joint and consequent expense in removing the shaft to some degree prevented.

The invention will first be fully described, and then pointed out in the claim.

In the drawing, A A' represent parts of the shaft to be connected. The adjacent ends of both parts A A' are sufficiently enlarged for greater strength of the joint and part A, provided with a threaded screw-pin, B, and a screw-extension, B', of smaller diameter, as shown in the drawing. The socket C of the adjoining part A' is recessed, threaded, and fitted for screws B B', securing, by means of the shoulders C', a strong and intimate joint of parts A A'.

As the second pin, B', may be of any suitable length, a very strong connection of the parts is obtained, and the annoying and expensive breaking of the shaft at the joints almost entirely avoided.

Having thus described my invention, I claim as new and desire to secure by Letters Patent—

The combination described of two screw-sections, B B', of unequal diameter, but with the same pitch of thread, and the internally-threaded sockets C C, having intermediate shoulder, against which rests the plane-extension of screw-section B to form a shaft-coupling.

JOHN HENRY BAUSER.

Witnesses:
JAMES SOLLEY,
R. E. NOSS.